(12) United States Patent
Maes (10) Patent No.: US 9,509,791 B2
(45) Date of Patent: Nov. 29, 2016

(54) POLICY-BASED EXPOSURE OF PRESENCE

(75) Inventor: Stephane H. Maes, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 106 days.

(21) Appl. No.: 12/986,577

(22) Filed: Jan. 7, 2011

(65) Prior Publication Data

US 2011/0167153 A1 Jul. 7, 2011

Related U.S. Application Data

(60) Provisional application No. 61/293,166, filed on Jan. 7, 2010.

(51) Int. Cl.
| | | |
|---|---|---|
| *G06F 15/173* | (2006.01) | |
| *H04L 29/08* | (2006.01) | |
| *G06F 17/30* | (2006.01) | |
| *G06Q 10/00* | (2012.01) | |
| *H04L 12/58* | (2006.01) | |
| *H04L 29/06* | (2006.01) | |
| *H04W 4/02* | (2009.01) | |
| *H04W 4/12* | (2009.01) | |
| *H04W 80/10* | (2009.01) | |

(52) U.S. Cl.
CPC ......... *H04L 67/24* (2013.01); *G06F 17/30908* (2013.01); *G06Q 10/00* (2013.01); *H04L 63/102* (2013.01); *H04L 67/2819* (2013.01); *H04L 67/2823* (2013.01); *H04L 67/306* (2013.01); *H04L 12/5815* (2013.01); *H04L 29/08684* (2013.01); *H04L 51/043* (2013.01); *H04L 63/0227* (2013.01); *H04W 4/02* (2013.01); *H04W 4/12* (2013.01); *H04W 80/10* (2013.01)

(58) Field of Classification Search
CPC .................. H04L 12/5812; H04L 29/08684; H04L 51/043; H04L 67/24
USPC ............... 709/203, 217, 219, 223, 224, 246; 726/1
See application file for complete search history.

(56) References Cited

U.S. PATENT DOCUMENTS

| | | |
|---|---|---|
| 6,035,025 A | 3/2000 | Hanson |
| 6,044,403 A | 3/2000 | Gerszberg et al. |

(Continued)

OTHER PUBLICATIONS

U.S. Appl. No. 12/986,432, filed Jan. 7, 2011, Final Office Action dated Jul. 31, 2012, 18 pages.

(Continued)

*Primary Examiner* — Liangche A Wang
*Assistant Examiner* — Johnny Aguiar
(74) *Attorney, Agent, or Firm* — Kilpatrick Townsend & Stockton LLP (57) ABSTRACT

Embodiments of the invention provide methods and systems for enforcing policy-based exposure of presence. The method includes receiving, from a service provider, a request for presence information about a subscriber, intercepting the request at a policy enforcer, and analyzing the request to determine attributes associated with the request. The method further includes, based in part on the determined attributes of the request, applying a policy to the request, and based on the applied policy, filtering the request for presence information about the subscriber. Further, the method includes forwarding the filtered request to a presence server, and publishing, to the service provider, the filtered presence information about the subscriber.

20 Claims, 7 Drawing Sheets

(56) References Cited

U.S. PATENT DOCUMENTS

| | | |
|---|---|---|
| 6,105,137 A | 8/2000 | Graunke et al. |
| 6,463,470 B1 | 10/2002 | Mohaban et al. |
| 6,493,437 B1 | 12/2002 | Olshansky |
| 6,603,844 B1 | 8/2003 | Chavez et al. |
| 6,842,628 B1 | 1/2005 | Arnold et al. |
| 7,043,553 B2 | 5/2006 | Monsen et al. |
| 7,137,003 B2 | 11/2006 | Krishnan et al. |
| 7,185,364 B2 | 2/2007 | Knouse et al. |
| 7,194,503 B2 | 3/2007 | Shell et al. |
| 7,293,177 B2 | 11/2007 | Lahti et al. |
| 7,346,545 B2 | 3/2008 | Jones |
| 7,403,763 B2 | 7/2008 | Maes |
| 7,487,493 B1 | 2/2009 | Faulkner |
| 7,562,216 B2 | 7/2009 | Borthakur et al. |
| 7,657,746 B2 | 2/2010 | Paramasivam et al. |
| 7,676,550 B1* | 3/2010 | Jachner ............... 709/217 |
| 7,809,898 B1 | 10/2010 | Kiselev et al. |
| 7,869,788 B2 | 1/2011 | Maes |
| 7,881,732 B2 | 2/2011 | Newville |
| 8,065,712 B1 | 11/2011 | Cheng et al. |
| 8,099,325 B2 | 1/2012 | Gangadharpalli et al. |
| 8,112,483 B1 | 2/2012 | Emigh et al. |
| 8,117,438 B1 | 2/2012 | Albisu et al. |
| 8,234,167 B2 | 7/2012 | Civanlar et al. |
| 8,335,720 B2 | 12/2012 | Juang et al. |
| 8,387,108 B1 | 2/2013 | Satish et al. |
| 8,479,265 B2 | 7/2013 | Maes |
| 2002/0116336 A1* | 8/2002 | Diacakis ............. G06Q 10/087 705/51 |
| 2002/0176579 A1 | 11/2002 | Deshpande et al. |
| 2002/0178381 A1 | 11/2002 | Lee et al. |
| 2003/0027549 A1 | 2/2003 | Kiel et al. |
| 2003/0135746 A1 | 7/2003 | Abbott et al. |
| 2003/0158914 A1 | 8/2003 | Satomi et al. |
| 2003/0208754 A1 | 11/2003 | Sridhar et al. |
| 2003/0233322 A1 | 12/2003 | Uchida et al. |
| 2004/0002878 A1 | 1/2004 | Maria Hinton |
| 2004/0044623 A1 | 3/2004 | Wake et al. |
| 2004/0054923 A1 | 3/2004 | Seago et al. |
| 2004/0059939 A1 | 3/2004 | de Jong |
| 2004/0098715 A1 | 5/2004 | Aghera et al. |
| 2004/0133909 A1 | 7/2004 | Ma |
| 2004/0198374 A1* | 10/2004 | Bajikar ............... 455/456.1 |
| 2004/0209595 A1 | 10/2004 | Bekanich |
| 2004/0209614 A1 | 10/2004 | Bright et al. |
| 2004/0260778 A1 | 12/2004 | Banister et al. |
| 2005/0014485 A1* | 1/2005 | Kokkonen et al. ........ 455/411 |
| 2005/0053241 A1 | 3/2005 | Fan et al. |
| 2005/0068167 A1* | 3/2005 | Boyer et al. ............ 340/531 |
| 2005/0091346 A1 | 4/2005 | Krishnaswami et al. |
| 2005/0108688 A1* | 5/2005 | Lucovsky et al. ......... 717/127 |
| 2005/0135240 A1* | 6/2005 | Ozugur ............... 370/229 |
| 2005/0138430 A1 | 6/2005 | Landsman |
| 2005/0154933 A1 | 7/2005 | Hsu et al. |
| 2005/0187940 A1* | 8/2005 | Lora et al. ............ 707/10 |
| 2005/0210499 A1 | 9/2005 | Shima |
| 2005/0262198 A1* | 11/2005 | Leppanen ........... H04L 29/06 709/204 |
| 2006/0040642 A1 | 2/2006 | Boris et al. |
| 2006/0184640 A1 | 8/2006 | Hatch |
| 2006/0212545 A1 | 9/2006 | Nichols et al. |
| 2006/0217107 A1 | 9/2006 | Maes |
| 2006/0242688 A1 | 10/2006 | Paramasivam et al. |
| 2006/0288099 A1* | 12/2006 | Jefferson et al. ............ 709/224 |
| 2007/0024453 A1* | 2/2007 | Mohammed et al. ...... 340/573.4 |
| 2007/0067297 A1 | 3/2007 | Kublickis |
| 2007/0143827 A1 | 6/2007 | Nicodemus et al. |
| 2007/0143829 A1 | 6/2007 | Hinton et al. |
| 2007/0162343 A1 | 7/2007 | Landesmann |
| 2007/0168510 A1* | 7/2007 | Ladd et al. ............ 709/225 |
| 2007/0191023 A1* | 8/2007 | Walter ............... 455/456.2 |
| 2007/0204017 A1 | 8/2007 | Maes |
| 2007/0244750 A1 | 10/2007 | Grannan et al. |
| 2007/0245414 A1 | 10/2007 | Chan et al. |
| 2008/0010301 A1* | 1/2008 | Tian et al. ............ 707/10 |
| 2008/0060000 A1 | 3/2008 | Drouet et al. |
| 2008/0086531 A1* | 4/2008 | Chavda et al. ............ 709/206 |
| 2008/0126779 A1 | 5/2008 | Smith |
| 2008/0133645 A1* | 6/2008 | Fridman ............... H04L 67/24 709/202 |
| 2008/0134259 A1* | 6/2008 | He ............... 725/91 |
| 2008/0140529 A1 | 6/2008 | Agarwal et al. |
| 2008/0201179 A1 | 8/2008 | Maes |
| 2008/0201188 A1 | 8/2008 | Heyman et al. |
| 2008/0205628 A1* | 8/2008 | Mandalia et al. ........ 379/265.11 |
| 2008/0208953 A1* | 8/2008 | Tian ............... H04L 67/24 709/201 |
| 2008/0221985 A1 | 9/2008 | Civanlar et al. |
| 2008/0240384 A1* | 10/2008 | Suryanarayana ..... H04L 12/581 379/88.21 |
| 2008/0301189 A1 | 12/2008 | Petit et al. |
| 2009/0037594 A1 | 2/2009 | Sever et al. |
| 2009/0047972 A1* | 2/2009 | Neeraj ............... 455/456.1 |
| 2009/0049309 A1 | 2/2009 | Brinker et al. |
| 2009/0187919 A1 | 7/2009 | Maes |
| 2009/0193117 A1* | 7/2009 | Oh ............... 709/224 |
| 2009/0255000 A1* | 10/2009 | Winterbottom et al. ....... 726/28 |
| 2009/0292595 A1 | 11/2009 | Tonnison et al. |
| 2009/0300704 A1* | 12/2009 | Boberg et al. ............ 726/1 |
| 2010/0005511 A1 | 1/2010 | Maes |
| 2010/0043077 A1 | 2/2010 | Robert |
| 2010/0064341 A1 | 3/2010 | Aldera |
| 2010/0075673 A1* | 3/2010 | Colbert et al. ............ 455/435.1 |
| 2010/0077484 A1* | 3/2010 | Paretti et al. ............ 726/26 |
| 2010/0088371 A1* | 4/2010 | Xu et al. ............ 709/203 |
| 2010/0099387 A1* | 4/2010 | So et al. ............ 455/414.1 |
| 2010/0100445 A1 | 4/2010 | Flood et al. |
| 2010/0154036 A1* | 6/2010 | McColgan et al. ............ 726/4 |
| 2010/0162126 A1* | 6/2010 | Donaldson et al. ........... 715/738 |
| 2010/0162149 A1* | 6/2010 | Sheleheda et al. ............ 715/764 |
| 2010/0257358 A1 | 10/2010 | Grajek et al. |
| 2010/0268767 A1* | 10/2010 | McColgan et al. ............ 709/203 |
| 2010/0299152 A1 | 11/2010 | Batchu et al. |
| 2010/0312621 A1 | 12/2010 | Abdulhayoglu |
| 2010/0325427 A1 | 12/2010 | Ekberg et al. |
| 2011/0010543 A1 | 1/2011 | Schmidt et al. |
| 2011/0038483 A1* | 2/2011 | Goeller et al. ............ 380/282 |
| 2011/0166943 A1 | 7/2011 | Maes |
| 2011/0167479 A1 | 7/2011 | Maes |
| 2011/0173251 A1* | 7/2011 | Sandhu et al. ............ 709/203 |
| 2011/0182283 A1 | 7/2011 | Van Buren et al. |
| 2011/0196728 A1 | 8/2011 | Maes |
| 2011/0197257 A1 | 8/2011 | Maes |
| 2011/0197260 A1 | 8/2011 | Maes |
| 2012/0030771 A1 | 2/2012 | Pierson et al. |
| 2012/0102334 A1 | 4/2012 | O'Loughlin et al. |
| 2012/0117255 A1* | 5/2012 | Oh et al. ............ 709/228 |
| 2012/0278869 A1 | 11/2012 | Guccione et al. |
| 2012/0284100 A1 | 11/2012 | Goldberg |
| 2012/0320888 A1* | 12/2012 | Annamalai et al. ............ 370/338 |
| 2013/0304913 A1* | 11/2013 | Boyer et al. ............ 709/224 |

OTHER PUBLICATIONS

U.S. Appl. No. 12/166,535, filed Jul. 2, 2008, Office Action dated Jun. 23, 2011, 5 pages.

U.S. Appl. No. 12/166,535, filed Jul. 2, 2008, Office Action dated Sep. 14, 2011, 15 pages.

U.S. Appl. No. 12/166,535, filed Jul. 2, 2008, Final Office Action dated Feb. 1, 2012, 13 pages.

U.S. Appl. No. 12/166,535, filed Jul. 2, 2008, Advisory Action dated Apr. 9, 2012, 3 pages.

U.S. Appl. No. 12/986,432, filed Jan. 7, 2011, Office Action dated Apr. 11, 2012, 15 pages.

U.S. Appl. No. 12/986,432, filed Jan. 7, 2011, Advisory Action dated Oct. 19, 2012, 2 pages.

U.S. Appl. No. 12/166,535, filed Jul. 2, 2008, Non-final Office Action mailed Nov. 21, 2012, 15 pages.

U.S. Appl. No. 13/022,377, filed Feb. 7, 2011, Non-final Office Action mailed Dec. 6, 2012, 37 pages.

U.S. Appl. No. 13/022,367, filed Feb. 7, 2011, Non-final Office Action mailed Dec. 17, 2012, 24 pages.

(56) References Cited

OTHER PUBLICATIONS

U.S. Appl. No. 12/166,535, filed Jul. 2, 2008, Notice of Allowance dated Mar. 5, 2013, 21 pages.
U.S. Appl. No. 12/986,435, filed Jan. 7, 2011, Non Final Office Action dated Feb. 5, 2013, 29 pages.
U.S. Appl. No. 12/986,435, filed Jan. 7, 2011, Final Office Action dated Mar. 22, 2013, 15 pages.
U.S. Appl. No. 13/022,373, filed Feb. 7, 2011, Non-final Office Action mailed Mar. 7, 2013, 79 pages.
Gasmelseid, T. M., "From Operational Dashboards to E-Business Multiagent Formulation of Electronic Contracts", Interantional Journal E-Business vol. 3, Issue 3, 2007, 21 pages.
U.S. Appl. No. 12/966,435, filed Jan. 7, 2011, Advisory Action dated May 29, 2013, 3 pages.
U.S. Appl. No. 13/022,367, filed Feb. 7, 2011, Terminal Disclaimer—Disapproved mailed Mar. 13, 2013, 1 page.
U.S. Appl. No. 13/022,377, filed Feb. 7, 2011, Final Office Action mailed Jun. 20, 2013, 23 pages.
U.S. Appl. No. 13/022,377, filed Feb. 7, 2011, Advisory Action mailed Aug. 30, 2013, 3 pages.
U.S. Appl. No. 13/022,367, filed Feb. 7, 2011, Final Office Action mailed Nov. 13, 2013, 28 pages.
U.S. Appl. No. 13/022,373, filed Feb. 7, 2011, Final Office Action mailed Oct. 7, 2013, 30 pages.
U.S. Appl. No. 12/986,432, filed Jan. 7, 2011, Restriction Requirement dated Mar. 23, 2012, 6 pages.
U.S. Appl. No. 13/022,377, filed Feb. 7, 2011, Non-Final Office Action mailed Jan. 10, 2014, 32 pages.
U.S. Appl. No. 13/022,373, filed Feb. 7, 2011, Advisory Action mailed Dec. 27, 2013, 3 pages.
U.S. Appl. No. 12/986,432, Non-Final Office Action mailed on Jul. 7, 2014, 16 pages.
U.S. Appl. No. 13/022,377, Advisory Action mailed on Jul. 16, 2014, 3 pages.
U.S. Appl. No. 12/986,435, Non-Final Office Action mailed on Apr. 23, 2014, 13 pages.
U.S. Appl. No. 13/022,367, Non-Final Office Action mailed on May 15, 2014, 13 pages.
U.S. Appl. No. 13/022,377, Final Office Action mailed on May 9, 2014, 27 pages.
U.S. Appl. No. 12/986,435, Final Office Action mailed on Aug. 6, 2014, 10 pages.
U.S. Appl. No. 13/022,377, Non-Final Office Action mailed on Sep. 9, 2014, 24 pages.
U.S. Appl. No. 12/986,432, Final Office Action mailed on Oct. 29, 2014, 20 pages.
U.S. Appl. No. 12/986,435, Non-Final Office Action mailed on Dec. 4, 2014, 10 pages.
U.S. Appl. No. 13/022,367, Final Office Action mailed on Dec. 3, 2014, 21 pages.
U.S. Appl. No. 12/986,432, Advisory Action mailed on Jan. 12, 2015, 2 pages.
U.S. Appl. No. 13/022,377, Final Office Action mailed on Jan. 5, 2015, 25 pages.
U.S. Appl. No. 12/986,435, Final Office Action mailed on Mar. 16, 2015, 11 pages.
U.S. Appl. No. 13/022,367, Non-Final Office Action mailed on Apr. 9, 2015, 12 pages.
U.S. Appl. No. 13/022,373, Final Office Action mailed on Jun. 1, 2015, 23 pages.
U.S. Appl. No. 13/022,377, Non-Final Office Action mailed on May 18, 2015, 28 pages.
U.S. Appl. No. 12/986,432, Non-Final Office Action mailed on Sep. 8, 2015, all pages.
U.S. Appl. No. 12/986,432, filed Jan. 7, 2011, Final Office Action dated Jan. 13, 2016, all pages.
U.S. Appl. No. 12/986,435, Non-Final Office Action mailed on Aug. 7, 2015, all pages.
U.S. Appl. No. 12/986,435 filed , Final Office Action mailed on Nov. 18, 2015, all pages.
U.S. Appl. No. 13/022,367, Notice of Allowance mailed on Sep. 29, 2015, all pages.
U.S. Appl. No. 13/022,373, Final Office Action mailed on Oct. 8, 2015, all pages.
U.S. Appl. No. 13/022,373, Advisory Action mailed on Dec. 23, 2015, all pages.
U.S. Appl. No. 13/022,377, Final Office Action mailed on Sep. 17, 2015, all pages.
U.S. Appl. No. 12/986,435, Advisory Action mailed on Feb. 2, 2016, 2 pages.
U.S. Appl. No. 13/022,377, Non-Final Office Action mailed on Feb. 1, 2016, 24 pages.
U.S. Appl. No. 12/986,435, filed Jan. 7, 2011, Non-Final Office Action dated Mar. 24, 2016, all pages.
U.S. Appl. No. 13/022,373, filed Feb. 7, 2011, Non-Final Office Action dated May 2, 2016, all pages.

\* cited by examiner

POLICY-BASED EXPOSURE OF PRESENCE

PRIORITY CLAIM

The application claims priority to U.S. Provisional Application No. 61/293,166, filed on Jan. 7, 2010, entitled POLICY-BASED EXPOSURE OF PRESENCE, which is incorporated by reference in its entirety for any and all purposes.

BACKGROUND OF THE INVENTION

Embodiments of the present invention relate generally to methods and systems for controlling exposure of presence and, more particularly, to enforcing policy-based exposure of presence.

Presently, an XML document management (XDM) server placed on a presence server allows for the processing of presence. XDM servers are inefficient, complicated to implement, and resource intensive, which makes them expensive to deploy and manage. Similarly, with an XDM server implemented on a presence server, the presence server must be powerful enough to handle the presence computations, as opposed to simply retrieving and transmitting raw presence information.

Presence is essential to improving the efficiency of every communication or collaboration process. Presence can be extracted from enterprise/business processes and integrated with all communication and collaboration processes, such as processes, within enterprises, between enterprises and partners/suppliers/customers, etc. Presence is an enterprise asset which can be used to leverage ubiquitously throughout an enterprise/business process, securely manage, expose and federate, and create new business processes. Enterprise presence should be federate-able with any relevant external source of presence. However, current presence gathering models and implementations fail to efficiently and rapidly gather presence information in such a way to take full advantage of the benefits of presence.

Nonetheless, problems with current presence gathering implementations include limits in systems and methods for working from a single data model common for all the needs of presence and or using the presence information. At present, no such system or implementation exists; hence, there is a need for improvements in the art.

DETAILED DESCRIPTION OF THE INVENTION

In the following description, for purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Methods for enforcing policy-based advertisements are described. For example, a service request (e.g., a webpage request, a short message service (SMS) text request, a voice telephone call request, a video request, etc.) may be intercepted by a policy enforcement mechanism. This policy enforcement mechanism may intercept the service request and check if usage policies have been satisfied (e.g., authentication, authorization, subscription, etc.). The policy enforcement mechanism may further check if an advertisement should be presented to the user, and if so, what type of advertisement over what type of medium. Various additional details of embodiments of the present invention will be described below with reference to the figures.

Figure 1:
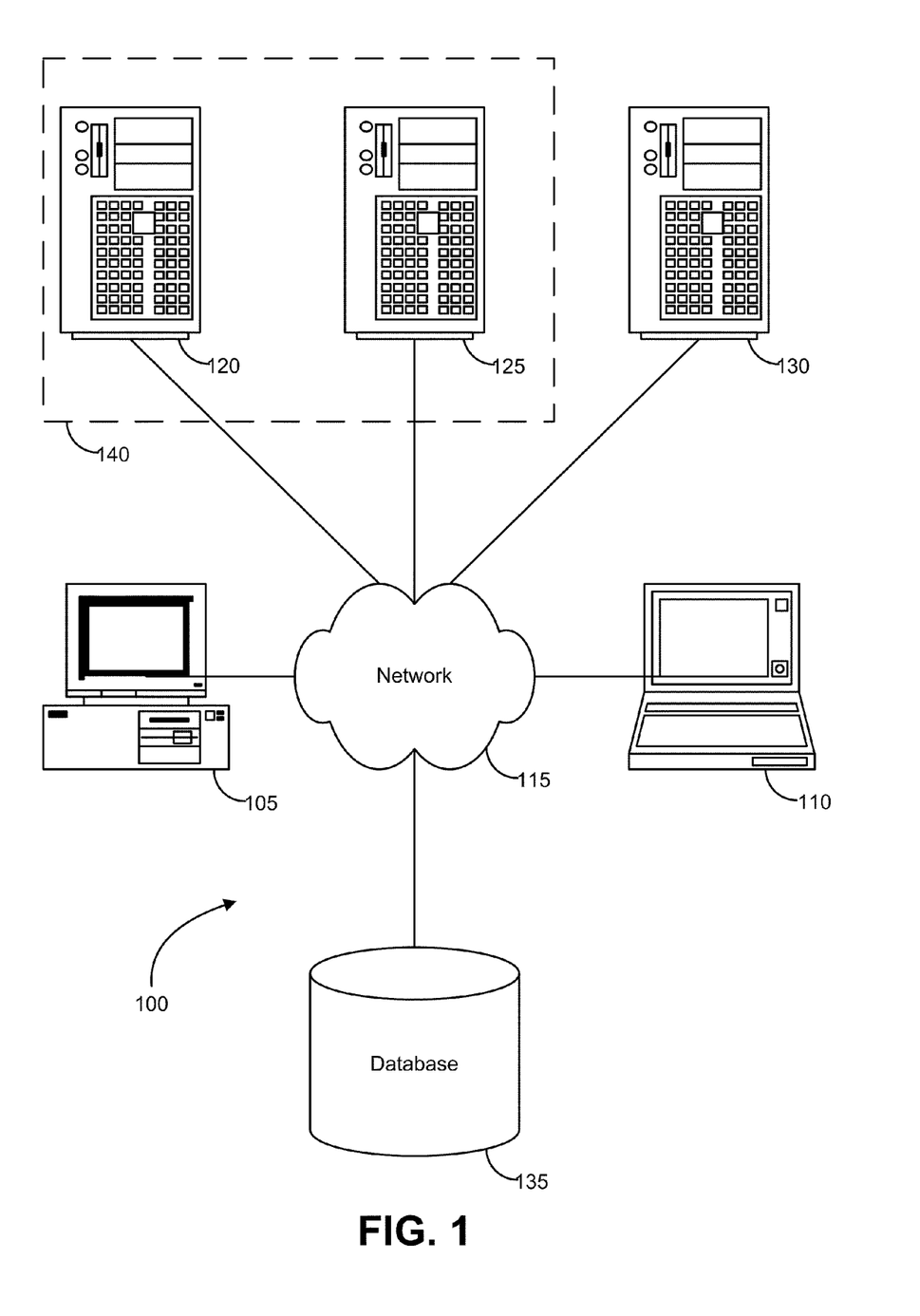
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 can include one or more user computers 105, 110, which may be used to operate a client, a dedicated application, a web browser, etc. The user computers 105, 110 can be general purpose personal computers (including, merely by way of example, personal computers and/or laptop computers running various versions of Microsoft® Corp.'s Windows® and/or Apple Corp.'s Macintosh® operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network 115 can be any type of network familiar to those skilled in the art that can support data communications using any of a variety of commercially available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network ("WAN"); a virtual network, including without limitation, a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO, etc.

The system 100 may also include one or more server computers 120, 125, 130 which can be general purpose computers and/or specialized server computers (including, merely by way of example, PC servers, UNIX servers, mid-range servers, mainframe computers rack-mounted servers, etc.), personal digital assistants (PDAs), and other such computing devices. One or more of the servers (e.g., 130) may be dedicated to running applications, such as a business application, a web server, an application server, etc. Such servers may be used to process requests from user computers 105, 110. The applications can also include any number of applications for controlling access to resources of the servers 120, 125, 130.

The web server 140 can be running an operating system including any of those discussed above, as well as any commercially available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation, those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from user computers 105, 110 and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 120, 125, 130. Alternatively, it may be remote from any or all of the computers 105, 110, 120, 125, 130, and/or in communication (e.g., via the network 115) with one or more of these. In a particular set of embodiments, the database 135 may reside in a storage-area network ("SAN") familiar to those skilled in the art. Similarly, any necessary files for performing the functions attributed to the computers 105, 110, 120, 125, 130 may be stored locally on the respective computer and/or remotely, as appropriate. In one set of embodiments, the database 135 may be a relational database, such as Oracle® 10g, that is adapted to store, update, and retrieve data in response to SQL-formatted commands.

Figure 2:
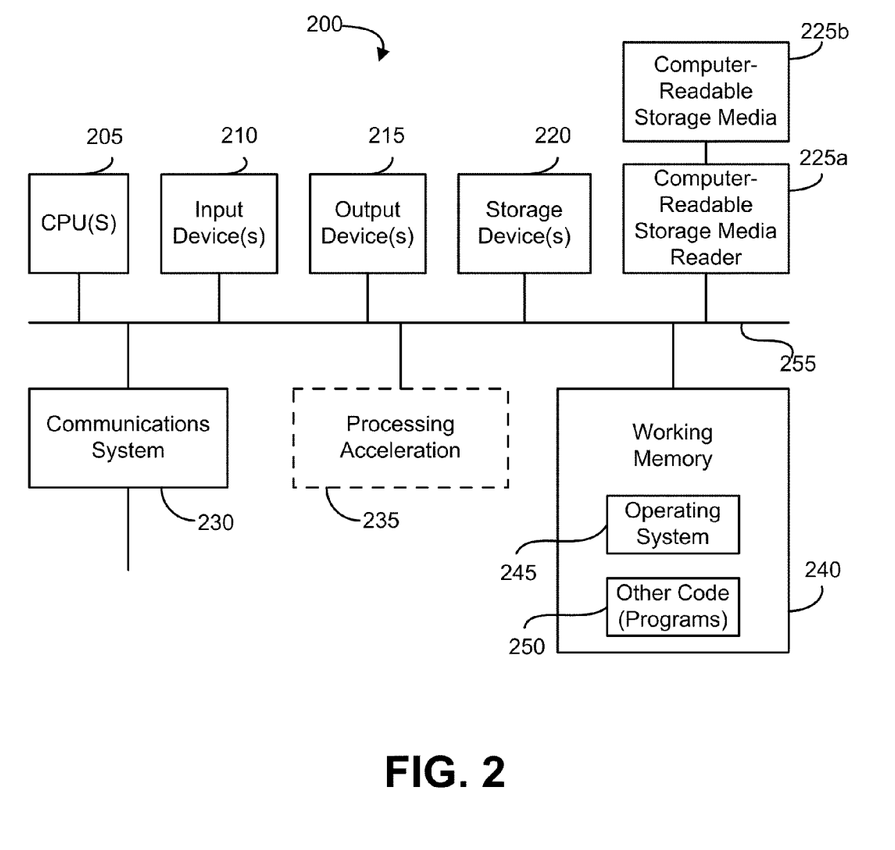
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage devices 220. By way of example, storage devices 220 may be disk drives, optical storage devices, and/or solid-state storage devices such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 115 (FIG. 1) and/or any other computer described above with respect to the system 200.

The computer system 200 may also be comprised of software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
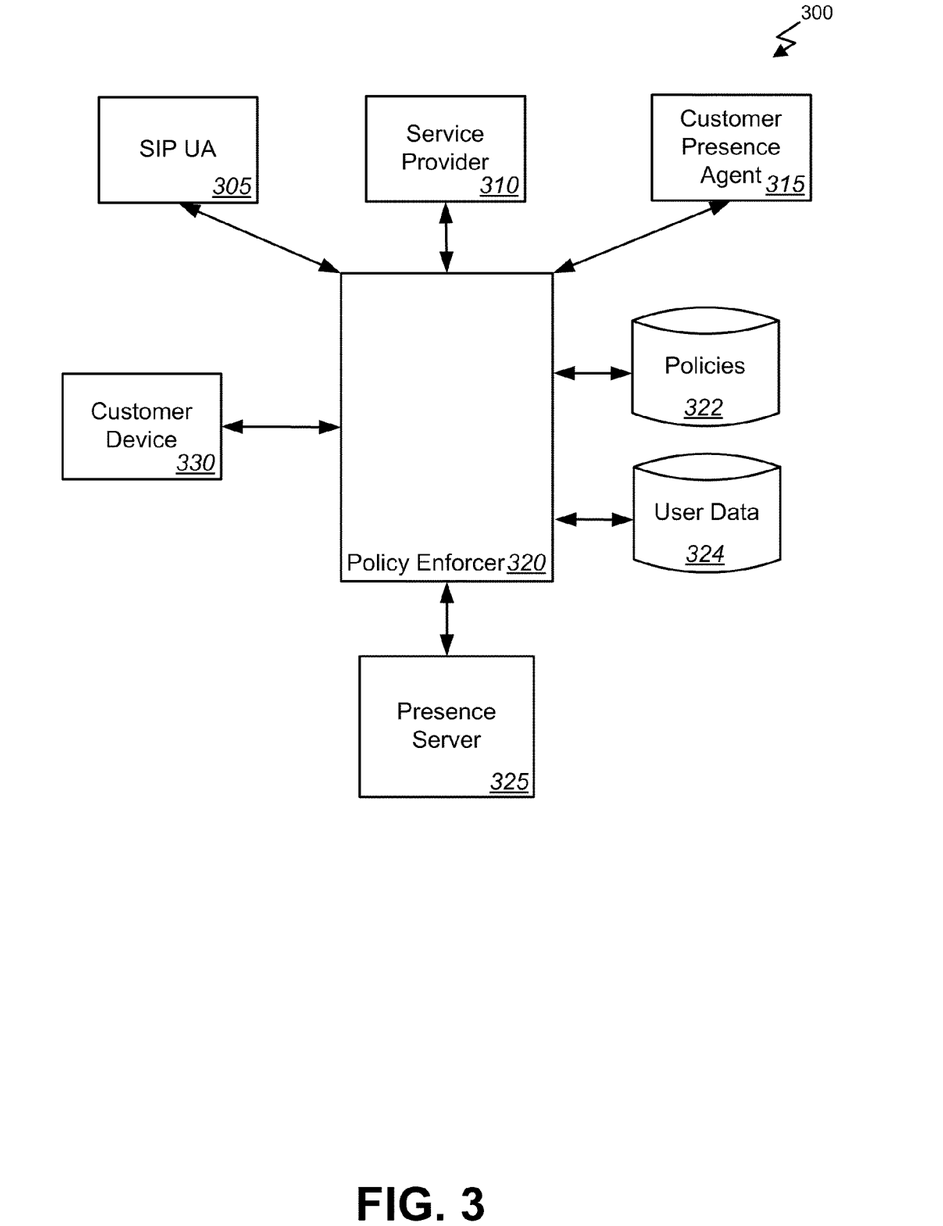
FIG. 3 is a block diagram illustrating, at a high level, functional components of a system for enforcing policy-based exposure of presence according to one embodiment of the present invention.

FIG. 3 is a block diagram illustrating, at a high level, functional components of a system 300 for enforcing policy-based exposure of presence according to one embodiment of the present invention. For example, system 300 may include, for example, a session initiation protocol (SIP) (or any other presence protocol available) user account (UA) 305, a service provider 310, and/or a customer presence agent 315. In one embodiment, service provider 310 may be a cellular service provider, an Internet service provider, an instant messaging service provider, an email host, etc. In a further embodiment, customer presence agent 315 may be a turn-by-turn global positioning system (GPS) service provider, a simple message system (SMS) text provider, etc. Each of SIP UA 305, service provider 310, and customer presence agent 315 may be configured to generate presence requests.

In one embodiment, presence may be, for example, the transient state of a principal (e.g., a subscriber, customer, client, service provider, etc.) that can be used by other principals to make a decision in real-time about how to best communicate with the first principal. In one embodiment, a principal may be an entity that has an identity that is capable of providing consent and other data to which authenticated actions are done on its behalf, or a principal may be an individual user, etc. such as, an individual user, a group of individuals, a corporation, service enablers/applications, system entities, other legal entities, etc.

The following are some of the benefits certain groups are afforded by presence information. End users may have the ability to determine presence of colleagues, to discover "service" or "department/organization" presence, to federate personal, public, and corporate presence, etc. Enterprises would have improved efficiency of enterprise processes by improving communication and collaboration processes, integrated presence capture and dissemination within all relevant enterprise processes, secure exposure/federation and enablement of organizational presence, etc.

Furthermore, operators and/or service providers (e.g., service provider 310) may benefit from presence information by having the opportunity to monetize presence information, offer new service opportunities, such as federated enterprise presence access on their network for "authorized" subscribers, and so forth. Device/terminal manufacturers may be able to provide product differentiations and receive increased product sales. At the same time, developers/ISVs may be able to develop and deploy new applications and services, and exploit/embed presence functionality in applications. As can be readily seen, fast, secure, and efficient gathering of presence information is of the utmost importance.

Additionally, with the improved ability to gather presence information, enterprise applications and providers (e.g., Oracle International Corp.™) may be able to provide extensible storage and retrieval in real-time, natively support SIP and XMPP, natively provide IM, natively provide "Group Presence Support", provide gateways for federation and interoperability, be able to interact with beehive bus for OCS component interaction, to provide a client implementation for presence and IM on Windows™ Desktops, to support Open Protocol standards for support on Linux™ and Mac™, etc.

A variety of situations/actions may be able to utilize presence information. For example, chat, voice, and web conferencing interaction may be enabled from a desktop. Cross device interaction may be enabled and workflow applications efficiency may be improved. Exposed presence state of applications for efficient end-user interaction may be achieved, as well as intelligent call routing in VoIP. Furthermore, multi-channel "follow-me" service may utilize presence information, efficient notification systems may be created, improved application interaction with end-users may be achieved, and skills/departmental presence may be obtained for increasing productivity.

In one example, suppose user A is subscribed to the presence of user B, and user B desires to communicate with user A at a given instant. User B can make the decision in real-time, depending upon the presence information of user A, whether user B is able to have a web-conference at that instant (if user A is available), schedule a web conference at a later time (if user A is currently unavailable), send user A an SMS text (if user A is available, but currently using a cellular device), send an email message to user A, etc. The resulting communication may not be immediate (i.e., decision may be sent in an email or may be left in a voice mail message), but user B, nonetheless, is able to communicate with user A in the best way possible based on user A's current presence information.

System 300 may be used to implement any of the above-described situations among other situations using a policy enforcer 320. In one embodiment, policy enforcer 320 may be connected with a policy database 322 and/or a user database 324. Furthermore, system 300 may also include a presence server 325 and a client/subscriber 330. In one embodiment, service provider 310, for example, may generate a presence request regarding client/subscriber 330. The presence request may be for client/subscriber 330's current location, for the purpose of sending client/subscriber 330 targeted advertisements, and the presence information may be requested to be shared with a third-party associated with service provider 310. Policy enforcer 320 may be situated between presence server 325 and any one of client/subscriber 330, SIP UA 305, service provider 310, or customer presence agent 315. Furthermore, any presence requests and/or responses would flow through (or be intercepted by) policy enforcer 320, such that policy enforcer 320 is configured to filter/modify the information contained in the presence requests or responses.

Accordingly, in the above example, policy enforcer 320 may intercept the service provider 310's presence request to client/subscriber 330, and based on the information being requested, the purpose of the requested information, the type of presence information, the account of client/subscriber 330, the type of business/service of service provider 310, etc., a policy from policies database 322 may be selected. Furthermore, policy enforcer 320 may access user database 324 to gather information about client/subscriber 330. Once policy enforcer 320 has determined the appropriate policy to use for the presence request, based on that policy, policy enforcer 320 filters and/or modifies that request.

For example, since the above-described request includes current location, for sending targeted advertisements, and to be shared with a third-party, policy enforcer 320 may filter the request to only provide connection status (either online or offline) of client/subscriber 330 instead of client/subscriber 330's current location. Alternatively, the request may be modified to allow service provider 310 to know client/subscriber 330's current location, but the information may be restricted to use only by service provider 310 and not the third-party.

As such, based on the modified presence request, policy enforcer 320 may access presence server 325 to retrieve the necessary information relating to client/subscriber 330's presence. Hence, policy enforcer 320 supplies a combination of conditions and/or actions that may take place with regard to incoming and out going presence requests. Accordingly, complete control and monitoring of presence information is achieved.

Figure 4:
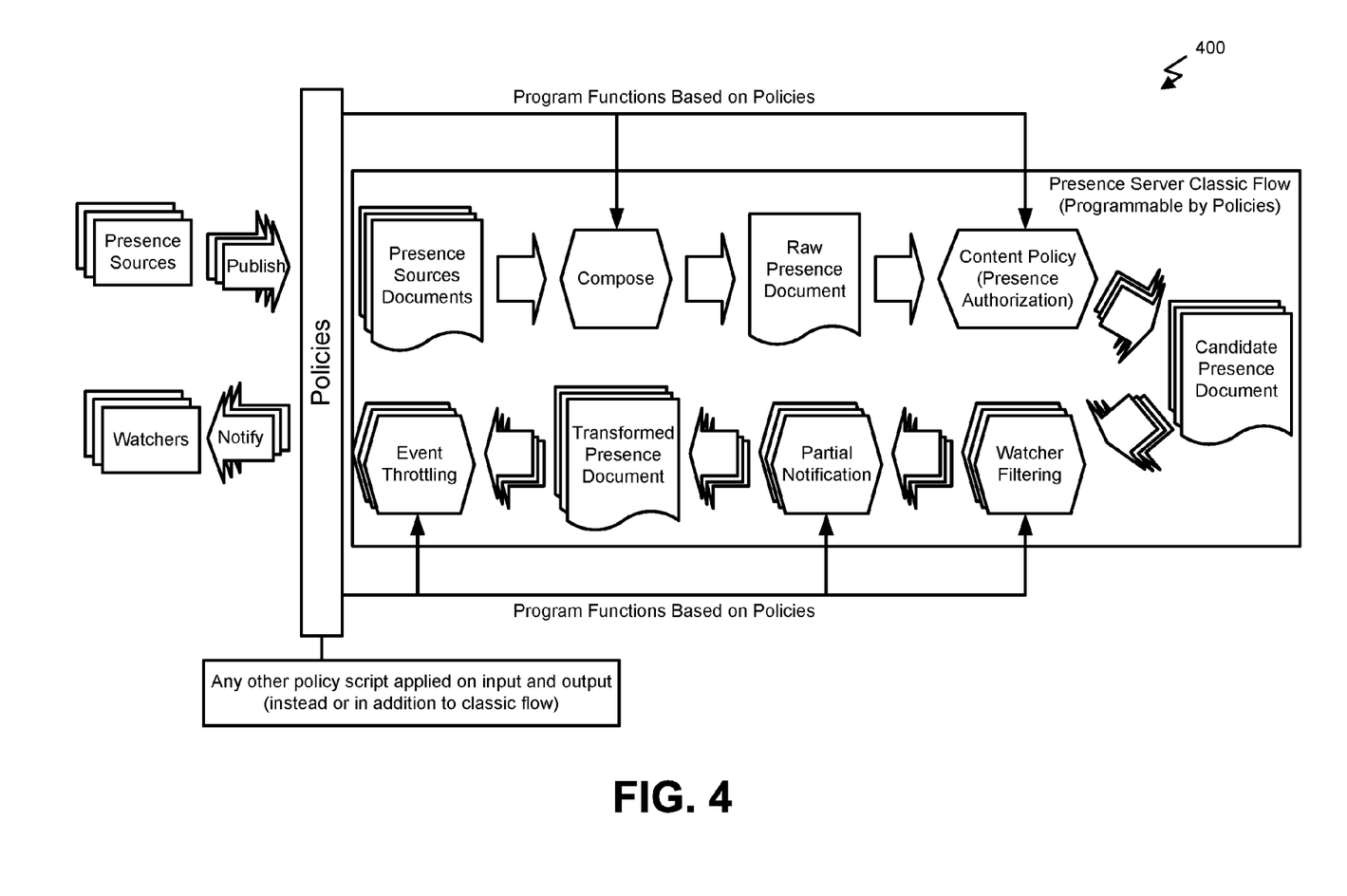
FIG. 4 is a block illustrating a system for enforcing policy-based exposure of presence according to one diagram embodiment of the present invention.

Turning now to FIG. 4 is a block diagram illustrating a system for enforcing policy-based exposure of presence according to a further embodiment of the present invention. Aspects of system 400 may be used to further implement preferences/filters on presence information as policies are enforced. For example, requests for presence updates, presence notifications/requests, etc. may be filtered and/or modified. As such, policy execution (i.e., filter, transform, preferences, etc.) from data model processing, and interface support may be factored out. The policies may be configured to provide workflow to handle input and output, and to provide programming of most common functions (i.e., workflow).

Thus, as exposed policies determine which attributes are passed on and which are transformed based on any consideration on the policies, modified presence information may be forwarded to a watcher/service provider. In an alternative embodiment, a policy may also be implemented using scripts and/or workflows executed when presence events occur. Furthermore, policy based exposure of presence may be integrated with collaboration services like oracle collaboration suite (OCS), Enterprise service Bus (ESB), and the like.

Turning back to system 400, a presence source 405 may attempt to publish presence information, in response to, for example, a request from a service provider, or presence gathering entity. The presence publication is then intercepted by policy enforcer 320, which interacts with presence server 325 in order to filter the presence information published. Once presence server 325 receives presence source documents 410, they may then be composed 415 into raw presence documents 420. Based on content policy 425 (i.e., presence authorization policy) the raw presence documents 425 are filtered to form candidate presence document 430.

In a further embodiment, the candidate presence document 430 may be filtered based on watcher information (435), and a partial notification 440 may then be generated. As a result, a transformed presence document 445 is generated, and the event in relation to the presence information is throttled (450). Once policy enforcer 320 receives the transformed presence document 445, policy enforcer 320 determines what presence information should be notified to watcher 455. Accordingly, policy enforcer 320 notifies watcher 455 based on the determination.

Figure 5:
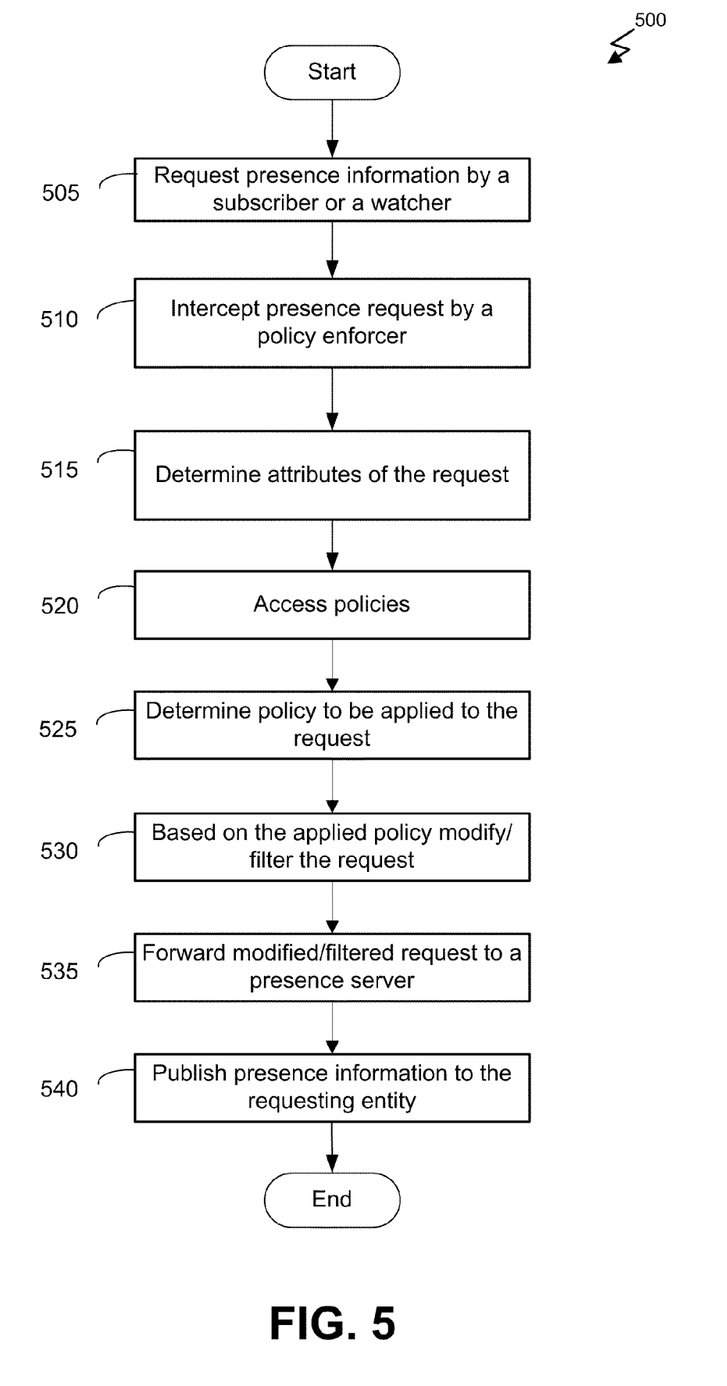
FIG. 5 is a flowchart illustrating a process for enforcing policy-based exposure of presence according to one embodiment of the present invention.

FIG. 5 is a flowchart illustrating a process for enforcing policy-based exposure of presence according to one embodiment of the present invention. In this example, at process block 505, a presence information request is generated either by a subscriber or a watcher. The request may include a request for information about the subscriber's connection status, location, device usage (e.g., on a cellular device, on a personal computer, available by email, etc.), etc.

At process block 510, the presence request is intercepted by a policy enforcer. The policy enforcer then analyzes the content of the request (e.g., the information requested, the use of the information, the destination of the information, etc.) to determine the attributes of the request (process block 515). Then, at process block 520, policies stored in, for example, a policy database are accessed, and the appropriate policy is applied to the request (process block 525).

Further, at process block 530, based on the applied policy(ies), the presence request may be filtered/modified. For example, in the context of social networking, a request from a user, that is unknown to the user for which the presence information is being requested, may only be authorized, based on the policy, to know the user's regional location, as opposed to the user's real-time exact location. As such, the policy enforcer would modify the request to only provide such information.

Optionally, the filtered/modified request may be forwarded to the presence server and the presence service may provide the policy enforcer with the requested information (process block 535). Then, at process block 540, the received presence information may be published to the requesting entity (or watcher). Accordingly, the requesting entity only receives the presence information for which it is authorized to receive.

Figure 6:
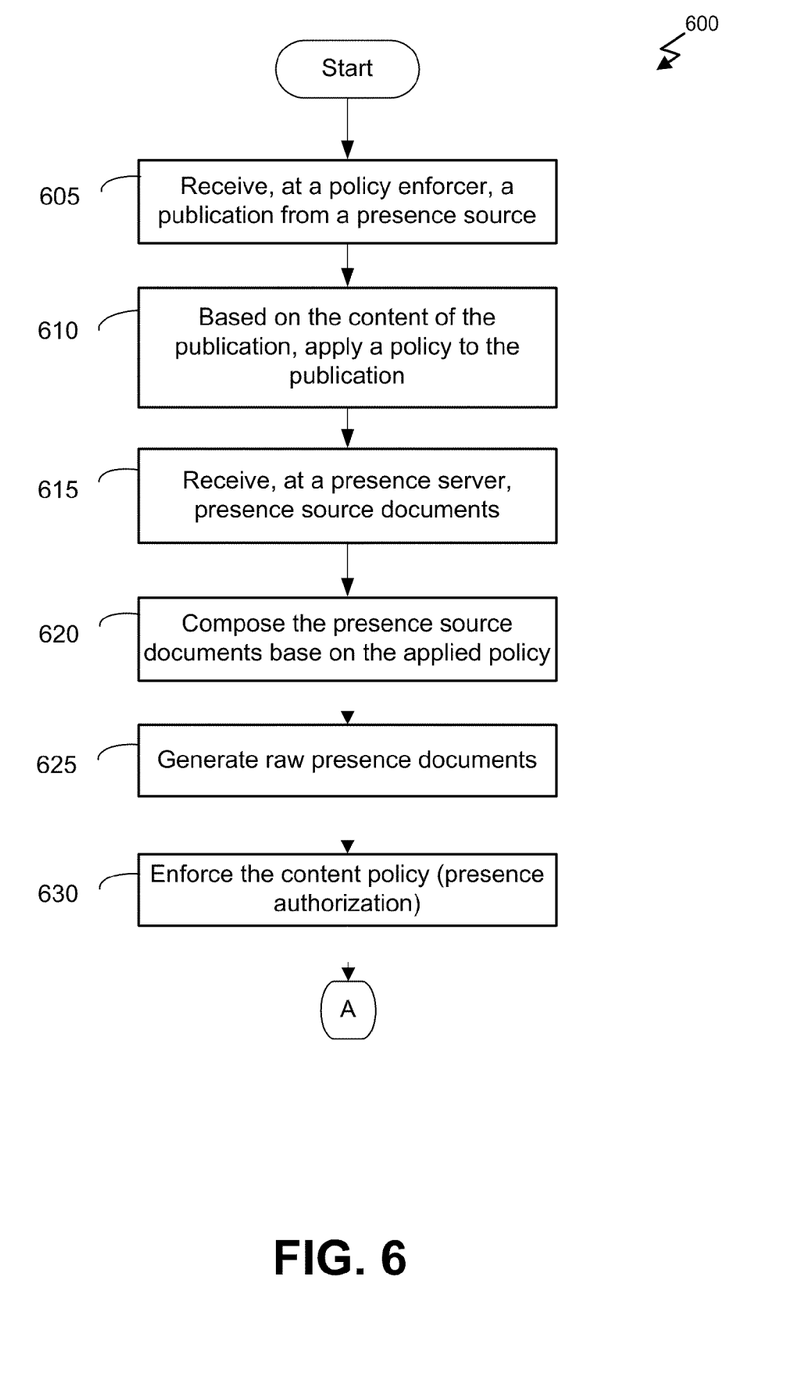
FIG. 6 is a flowchart illustrating a process for enforcing policy-based exposure of presence according to yet another embodiment of the present invention.

FIG. 6 is a flowchart illustrating an alternative process for enforcing policy-based exposure of presence according to one embodiment of the present invention. In this example, at process block 605, a publication from a presence source is received by a policy enforcer. At process block 610, based on the content of the publication, a policy is applied to the publication in order to filter the presence information in the publication.

At process block 615, a presence server receives presence source documents related to the publication, and then the presence source documents may be composed based on the selected policy (process block 620). As such, raw presence documents may be generated (process block 625), and then the content policy (or presence authorization) may be enforced on the raw presence documents (process block 630).

Figure 7:
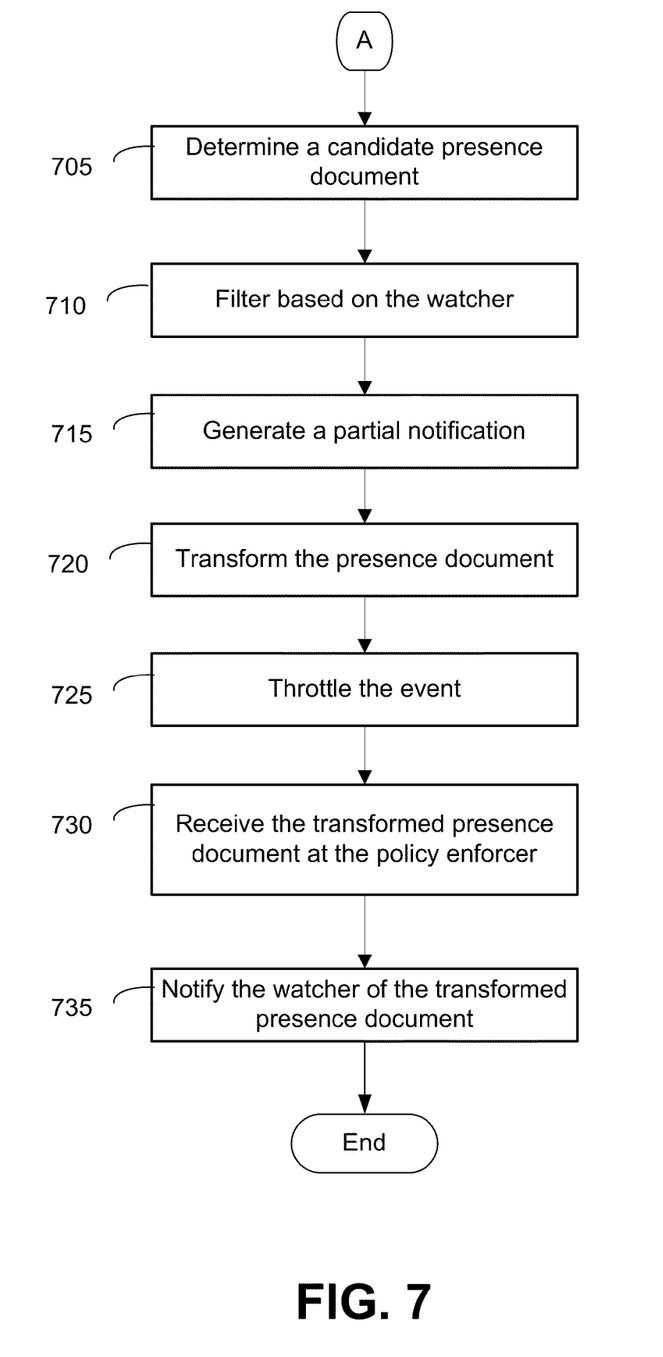
FIG. 7 is a flowchart illustrating a process for enforcing policy-based exposure of presence according to a further embodiment of the present invention.

FIG. 7 is a flowchart further illustrating an alternative process for enforcing policy-based exposure of presence according to one embodiment of the present invention. In this example, continuing from point A in FIG. 6, at process block 705, a candidate presence document is determined. At process block 710, the candidate presence document may then be filtered based, in part, on the watcher which is receive the publication.

At process block 715, a partial publication notification may be generated, and the presence document may be transformed (process block 720). At process block 725, the event associated with the publication is throttled, and the transformed presence document is received at the policy enforcer (process block 730). At process block 735, the watcher is notified of the transformed presence document.

In the foregoing description, for the purposes of illustration, methods were described in a particular order. It should be appreciated that, in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits, programmed with the instructions to perform the methods. These machine-executable instructions may be stored on one or more machine-readable mediums, such as CD-ROMs or other types of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of enforcing policy-based exposure of presence, the method comprising:
    intercepting, at a policy enforcer, a request for presence information about a first subscriber to a presence service, the request for the presence information being sent from a service provider for a second subscriber to the presence service, wherein the service provider sends targeted advertisements to the first subscriber, and wherein the request for the presence information comprises a request for a real-time geographic location of the first subscriber;
    analyzing, by the policy enforcer, the request for the presence information to determine attributes associated with the request;
    applying, by the policy enforcer, a policy to the request, the policy being selected from a plurality of policies based at least in part on the attributes associated with the request for the presence information;
    based at least in part on the policy, modifying, by the policy enforcer, the request for the presence information by:
        changing, based on the service provider sending targeted advertisements to the first subscriber, the request for the real-time geographic location of the first subscriber to a request for an online or offline connection status of the first subscriber; and
        adding a use restriction that the presence information can only be used by the service provider and not by a third party; and
    forwarding the request for the presence information from the policy enforcer to the presence service.

2. The method of claim 1, wherein the service provider comprises one or more of the following: a Session Initiation Protocol (SIP) User Agent (UA) provider, a customer presence agent, and a third party application provider.

3. The method of claim 2, wherein the third party application provider provides one or more of the following applications: a simple message service (SMS) text application, an instant messenger (IM) application, an email application, a web conferencing application, and a teleconferencing application.

4. The method of claim 1, wherein the attributes associated with the request for the presence information comprise a source, a type of information being requested, a destination, and an intended use of the presence information.

5. The method of claim 1, wherein the policy is included in a policy database comprising the plurality of policies.

6. The method of claim 5, wherein the plurality of policies each allows a threshold level of presence information about the first subscriber to be exposed.

7. The method of claim 5, wherein the plurality of policies provide to the policy enforcer conditions and/or actions to be taken in relation to the request for the presence information received from the service provider.

8. The method of claim 7, wherein the policy comprises a policy script to be applied to the request for the presence information and/or the presence information.

9. The method of claim 1, wherein the first subscriber is one or more of the following: an Internet Service Provider (ISP) subscriber, a cellular phone subscriber, and a Voice Over Internet Protocol (VOIP) service subscriber.

10. A system for enforcing policy-based advertisements, the system comprising:
    a processor; and
    a memory storage device in communication with the processor, the memory storage device having sets of instructions stored thereon which, when executed by the processor, cause the processor to:
        intercept, at a policy enforcer, a request for presence information about a first subscriber to a presence service, the request for the presence information being sent from a service provider for a second subscriber to the presence service, wherein the service provider sends targeted advertisements to the first subscriber, and wherein the request for the presence information comprises a request for a real-time geographic location of the first subscriber;
        analyze, by the policy enforcer, the request for the presence information to determine attributes associated with the request;
        apply, by the policy enforcer, a policy to the request, the policy being selected from a plurality of policies based at least in part on the attributes associated with the request for the presence information;
        based at least in part on the policy, modify, by the policy enforcer, the request for the presence information by:
            changing, based on the service provider sending targeted advertisements to the first subscriber, the request for the real-time geographic location of the first subscriber to a request for an online or offline connection status of the first subscriber; and adding a use restriction that the presence information can only be used by the service provider and not by a third party; and forward the request for the presence information from the policy enforcer to the presence service.

11. The system of claim 10, wherein the sets of instructions further cause the processor to implement a policy database coupled with the policy enforcer, the policy database configured to store the policy and transmit the policy to the policy enforcer upon request.

12. The system of claim 10, wherein the service provider comprises one or more of the following: a Session Initiation Protocol (SIP) User Agent (UA) provider, a customer presence agent, and a third party application provider.

13. The system of claim 12, wherein the third party application provider provides one or more of the following applications: a simple message service (SMS) text application, an instant messenger (IM) application, an email application, a web conferencing application, and a teleconferencing application.

14. The system of claim 10, wherein the attributes associated with the request for the presence information comprise a source, a type of information being requested, a destination, and an intended use of the presence information.

15. The system of claim 10, wherein the first subscriber is one or more of the following: an Internet Service Provider (ISP) subscriber, a cellular phone subscriber, and a Voice Over Internet Protocol (VOIP) service subscriber.

16. A non-transitory machine-readable medium including sets of instructions stored thereon for enforcing policy-based exposure of presence which, when executed by a machine, causes the machine to:

intercept, at a policy enforcer, a request for presence information about a first subscriber to a presence service, the request for the presence information being sent from a service provider for a second subscriber to the presence service, wherein the service provider sends targeted advertisements to the first subscriber, and wherein the request for the presence information comprises a request for a real-time geographic location of the first subscriber;

analyze, by the policy enforcer, the request for the presence information to determine attributes associated with the request;

apply, by the policy enforcer, a policy to the request, the policy being selected from a plurality of policies based at least in part on the attributes associated with the request for the presence information;

based at least in part on the policy, modify, by the policy enforcer, the request for the presence information by:

changing, based on the service provider sending targeted advertisements to the first subscriber, the request for the real-time geographic location of the first subscriber to a request for an online or offline connection status of the first subscriber; and adding a use restriction that the presence information can only be used by the service provider and not by a third party; and forward the request for the presence information from the policy enforcer to the presence service.

17. The non-transitory machine-readable medium of claim 16, wherein the service provider comprises one or more of the following: a Session Initiation Protocol (SIP) User Agent (UA) provider, a customer presence agent, and a third party application provider.

18. The non-transitory machine-readable medium of claim 17, wherein the third party application provider provides one or more of the following applications: a simple message service (SMS) text application, an instant messenger (IM) application, an email application, a web conferencing application, and a teleconferencing application.

19. The non-transitory machine-readable medium of claim 16, wherein the attributes associated with the request for the presence information comprise a source, a type of information being requested, a destination, and an intended use of the presence information.

20. The non-transitory machine-readable medium of claim 16, wherein the first subscriber is one or more of the following: an Internet Service Provider (ISP) subscriber, a cellular phone subscriber, and a Voice Over Internet Protocol (VOIP) service subscriber.

* * * * *

UNITED STATES PATENT AND TRADEMARK OFFICE
CERTIFICATE OF CORRECTION

PATENT NO.         : 9,509,791 B2                               Page 1 of 1
APPLICATION NO.    : 12/986577
DATED              : November 29, 2016
INVENTOR(S)        : Maes It is certified that error appears in the above-identified patent and that said Letters Patent is hereby corrected as shown below:

On the Title Page

On page 3, Column 1, under Other Publications, Line 10, delete "Interantional" and insert
-- International --, therefor.

In the Specification

In Column 1, Line 43, delete "and or" and insert -- and/or --, therefor.

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*